H. J. WHITE,

Assignor to HOLMES, BOOTH & HAYDENS.

Lamp Burner.

No. 9,498. Reissued Dec. 7, 1880.

Witnesses

Chas. N. Smith

Harold Ferrell

Inventor.

Hiram J. White.

for Lemuel W. Serrell atty.

N. PETERS, PHOTO-LITHOGRAPHER, WASHINGTON, D. C.

UNITED STATES PATENT OFFICE.

HIRAM J. WHITE, OF BOSTON, MASSACHUSETTS, ASSIGNOR TO HOLMES, BOOTH & HAYDENS, OF WATERBURY, CONNECTICUT.

LAMP-BURNER.

SPECIFICATION forming part of Reissued Letters Patent No. 9,498, dated December 7, 1880.

Original No. 102,897, dated May 10, 1870. Application for reissue filed April 22, 1880.

*To all whom it may concern:*

Be it known that I, HIRAM J. WHITE, of Boston, county of Suffolk, State of Massachusetts, have invented an Improvement in Lamp-Burners, of which the following is a specification.

Lamps have been made with pendent springs acting within the base of the chimney, and an outward flange at the lower end of each spring supported the chimney. Air-distributers have been made that are flat, convex, and conical. These usually have had more or less of a rim around them, that prevented the surface of the air-distributer being wiped off clean with facility. The air-distributer has been raised above the chimney-rest, but the springs or lateral supports to the chimney have been upon a cylinder that is above the air-distributer and is below and separate from the removable deflector; hence the chimney acts with a leverage against the cylinder to loosen it from the air-distributer.

My invention is made for facilitating the cleaning of the air-distributer, for simplifying the construction of the lamp, and for increasing its efficiency and durability.

In my lamp the air-distributer is raised to facilitate cleaning. The cone or deflector is of an ordinary dome shape, and its lower edge directly surrounds the air-distributer and rests upon a shoulder formed in the metal, so as to be directly supported thereby. The air-distributer is near the upper end of the wick-tube, so that the deflector only requires to be of an ordinary height.

The chimney-springs are in the metal around the air-distributer. They do not form a chimney-rest, but the chimney-support is rigid and below the springs.

Figure 1:
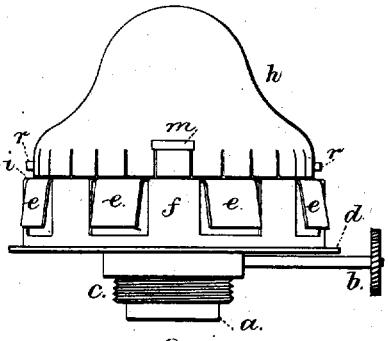
Figure 6:
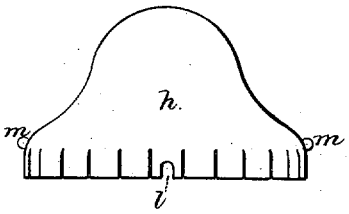
Figure 2:
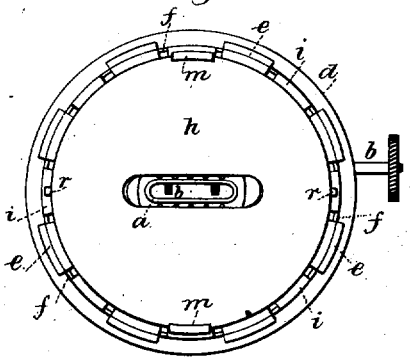
Figure 4:
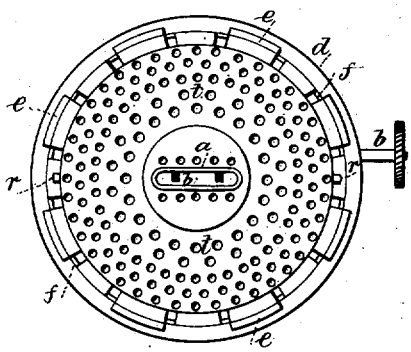
Figure 3:
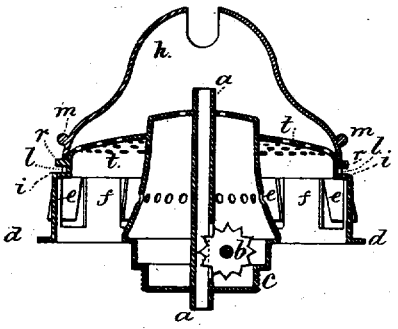
Figure 5:
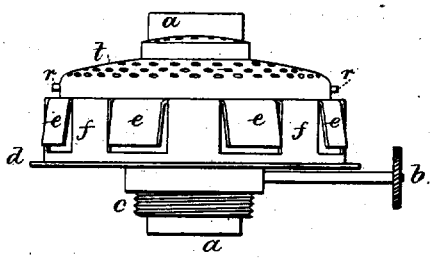

In the drawings, Figure 1 is an elevation of the burner. Fig. 2 is a plan of the same. Fig. 3 is a vertical section. Fig. 4 is a plan of the burner with the cone or deflector removed. Fig. 5 is a side elevation of the parts shown in Fig. 4; and Fig. 6 is a side view of the cone or deflector detached.

The wick-tube *a*, wick-raiser *b*, screw-base *c*, and cap rising above and forming a cover to the ratchet and a support for the wick-tube, are of any usual or desired character.

The chimney-holder is made with a base or chimney-support, *d*, upon which the lower end of the chimney rests.

The springs *e* that hold the chimney act inside such chimney. They are shown as tongues formed by horizontal and vertical incisions in the metal cylindrical portion *f* of the burner. The ends of the springs point downwardly, so as to allow the chimney to be placed over them with facility.

The air-distributer *t* is made of a metal plate with numerous small holes. It is around the wick-tube and extends outwardly from the same, and is bent downwardly to form the shoulder *i*, upon which the base of the cone or deflector *h* rests. The air-distributer is above the shoulder *i*, upon which the cone or deflector *h* rests, so that it can easily be kept clean and free from carbonaceous matter, which is liable to obstruct the holes or to make the lamp smell.

The handles at *m* are upon opposite sides of the cone or deflector, to facilitate removal, and the base of such cone is notched at *l*, so as to fit upon studs *r*, at the edges of the air-distributer, in order that the flame-slot in the air-distributer may occupy the correct position to the wick; and in Figs. 1 and 6 the cone is shown with vertical incisions that form the base into slightly-yielding springs, to aid in keeping the cone in position.

I claim as my invention—

1. The combination, with the raised air-distributer surrounding the upper part of the wick-tube, of a convex or dome-shaped deflector, the lower edge of which surrounds the raised air-distributer and rests upon a shoulder in the metal, and internally-acting chimney-springs and a rigid chimney-support below the air-distributer, substantially as set forth.

2. In a lamp-burner having a raised air-distributer near the upper part of the wick-tube, a convex or dome-shaped deflector, the lower edge of which directly surrounds and incloses the air-distributer, substantially as set forth.

Signed by me this 15th day of April, A. D. 1880.

HIRAM J. WHITE.

Witnesses:
GEO. E. TERRY,
E. S. HAYDEN.